United States Patent
Kim et al.

(10) Patent No.: US 6,953,376 B1
(45) Date of Patent: Oct. 11, 2005

(54) BUBBLE BLOWER AND BUBBLE BLOWER EQUIPPED VEHICLE

(75) Inventors: Chul-Min Kim, Busan (KR);
Haeng-Chul Shin, 26/4, #390-6, Yongho-dong, Nam-ku, Busan (KR)

(73) Assignees: 505 Toys Ltd., Busan (KR); Haeng-Chul Shin, Busan (KR)

( * ) Notice: Subject to any disclaimer, the term of this patent is extended or adjusted under 35 U.S.C. 154(b) by 0 days.

(21) Appl. No.: 10/871,596

(22) Filed: Jun. 21, 2004

(30) Foreign Application Priority Data

| | | | |
|---|---|---|---|
| Apr. 17, 2004 | (KR) | | 10-2004-26433 |
| Apr. 17, 2004 | (KR) | | 10-2004-26434 |

(51) Int. Cl.$^7$ .......................................... A63H 33/28
(52) U.S. Cl. ..................... 446/15; 446/21; 446/175; 446/180; 446/484
(58) Field of Search ..................... 446/267, 15, 16, 446/18, 21, 17, 74, 175, 178–182, 210, 475, 446/483–485

(56) References Cited

U.S. PATENT DOCUMENTS

| | | | | |
|---|---|---|---|---|
| 3,677,446 A | * | 7/1972 | Guyer et al. ................. | 222/610 |
| 4,133,124 A | | 1/1979 | Chang et al. | |
| 4,423,565 A | * | 1/1984 | Bart ............................. | 446/16 |
| 4,556,392 A | * | 12/1985 | Chang .......................... | 446/16 |
| 5,462,469 A | * | 10/1995 | Lei ............................... | 446/15 |
| 5,613,890 A | * | 3/1997 | DeMars ........................ | 446/15 |
| 6,341,882 B1 | | 1/2002 | Lin | |
| 6,386,935 B1 | | 5/2002 | Lin | |
| 6,416,377 B1 | * | 7/2002 | Bart ............................. | 446/15 |
| 6,450,851 B1 | * | 9/2002 | Rehkemper et al. .......... | 446/15 |
| 6,474,835 B1 | | 11/2002 | Lin | |
| 6,647,927 B1 | * | 11/2003 | Werde et al. ................ | 119/711 |
| 2002/0163802 A1 | | 11/2002 | Lin | |

* cited by examiner

Primary Examiner—Bena Miller
(74) Attorney, Agent, or Firm—Robert E. Bushnell, Esq.

(57) ABSTRACT

A bubble blower and a bubble blower equipped vehicle includes: a case; a discharge hole adapted to discharge bubbles, the discharge hole being arranged in a front portion of the case; a detachable cartridge filled with a bubble producing liquid and affixed to a lower portion of the case; a supply path arranged between the detachable cartridge and the discharge hole and adapted to transfer the bubble producing liquid from the detachable cartridge; a blower fan arranged within an inner portion of the case and adapted to produce a stream of air, the bubble producing liquid being sprayed into the stream of air from the supply path to produce bubbles; a handle arranged on a lower portion of the case; a switch arranged on one side of an outer face of the case and adapted to operate the fan; a reflector plate arranged to encircle the discharge hole; and a plurality of Light Emitting Diodes (LEDs) arranged on the reflector plate.

8 Claims, 9 Drawing Sheets

BUBBLE BLOWER AND BUBBLE BLOWER EQUIPPED VEHICLE

CLAIM OF PRIORITY

This application makes reference to and claims all benefits accruing under 35 U.S.C. §119 from two applications for BUBBLE BLOWER AND THE VEHICLES EQUIPPED WITH THE SAME, both of which were earlier filed in the Korean Intellectual Property Office on the 17 Apr. 2004 and there duly assigned Serial No.(s) 2004-26433 and 2004-26434.

BACKGROUND OF THE INVENTION

1. Field of the Invention

The present invention relates to a bubble blower and a bubble blower equipped vehicle which blows soap bubbles. More precisely, the present invention relates to a bubble blower and a bubble blower equipped vehicle which creates a beautiful atmosphere by illuminating the blown soap bubbles at night.

2. Description of the Prior Art

Generally, a bubble blower has a discharge hole in a front portion thereof and has a detachable container filled with a liquid soap. The bubble blower includes a path for supplying the liquid soap and a blower fan and a switch arranged in a handle located on one side of the blower case. The user grips the handle and turns the switch on and thereby operates the blower fan. The airflow generated by the blower fan is directed toward the discharge hole and bubbles are blown outward.

Such bubble blowers discussed above can only blow bubbles and if the user uses the bubble blower in a dark place at night, the blown bubbles cannot be seen. Furthermore, if the bubbles are blown when the user is riding a vehicle, such as a child's scooter, in-line skates, skateboards, bicycles or a child's motorcycle, etc., it is possible to produce beautiful bubbles because the bubbles are spread out very quickly but if such bubbles are produced when the user rides the vehicle in a dark place at night, the blown bubbles cannot be seen.

The following patents each discloses features in common with the present invention but do not teach or suggest the inventive features specifically recited in the present application: U.S. Patent Application No. 2002/0163802 to Lin, entitled TOUCH-CONTROLLED LIGHTING CIRCUIT ASSEMBLY, published on Nov. 7, 2002; U.S. Pat. No. 6,474,835 to Lin, entitled TOUCH-CONTROLLED LIGHTING CIRCUIT ASSEMBLY, issued on Nov. 5, 2002; U.S. Pat. No. 6,386,935 to Lin, entitled BUBBLE BLOWER COMBINATION TOY, issued on May 14, 2002; U.S. Pat. No. 6,341,882 to Lin, entitled LIGHT EMITTING CIRCUIT ASSEMBLY FOR TOY, issued on Jan. 29, 2002; and U.S. Pat. No. 4,133,124 to Chang et al., entitled DISPLAY DEVICE, issued on Jan. 9, 1979.

SUMMARY OF THE INVENTION

The present invention has been developed to solve the problems stated above. It is an object of the present invention to provide a bubble blower that can create a more beautiful atmosphere by illuminating the blown soap bubbles at night.

It is another object of the present invention to provide a bubble blower equipped vehicle that can create a more beautiful atmosphere by illuminating the blown soap bubbles at night.

These and other aspects of the present invention can be effected by providing a bubble blower comprising: a case; a discharge hole adapted to discharge bubbles, the discharge hole being arranged in a front portion of the case; a detachable cartridge filled with a bubble producing liquid and affixed to a lower portion of the case; a supply path arranged between the detachable cartridge and the discharge hole and adapted to transfer the bubble producing liquid from the detachable cartridge; a blower fan arranged within an inner portion of the case and adapted to produce a stream of air, the bubble producing liquid being sprayed into the stream of air from the supply path to produce bubbles; a handle arranged on a lower portion of the case; a switch arranged on one side of an outer face of the case and adapted to operate the fan; a reflector plate arranged to encircle the discharge hole; and a plurality of Light Emitting Diodes (LEDs) arranged on the reflector plate.

The bubble blower can further comprise: a passage hole arranged in a center portion of the reflector plate between the case and the discharge hole; and a plurality of holes arranged in the reflector plate to respectively receive the plurality of LEDs.

These and other aspects of the present invention can also be effected by providing a bubble blower equipped vehicle comprising: a case arranged on a rear portion of the vehicle; a discharge hole adapted to discharge bubbles, the discharge hole being arranged in a front portion of the case; a detachable cartridge filled with a bubble producing liquid and affixed to a lower portion of the case; a supply path arranged between the detachable cartridge and the discharge hole and adapted to transfer the bubble producing liquid from the detachable cartridge; a blower fan arranged within an inner portion of the case and adapted to produce a stream of air, the bubble producing liquid being sprayed into the stream of air from the supply path to produce bubbles; a handle arranged on a lower portion of the case and adapted to affix the bubble blower to the vehicle; a switch arranged on one side of an outer face of the case and adapted to operate the fan; a reflector plate arranged to encircle the discharge hole; and a plurality of Light Emitting Diodes (LEDs) arranged on the reflector plate.

The bubble blower equipped vehicle can further comprise: a passage hole arranged in a center portion of the reflector plate between the case and the discharge hole; and a plurality of holes arranged in the reflector plate to respectively receive the plurality of LEDs.

These and other aspects of the present invention can yet also be effected by providing a bubble blower comprising: a case; at least one discharge hole adapted to discharge bubbles, the at least one discharge hole being arranged in the case; a cartridge filled with a bubble producing liquid; a supply path arranged between the cartridge and the at least one discharge hole and adapted to transfer the bubble producing liquid from the cartridge; a blower fan arranged adapted to produce a stream of air, the bubble producing liquid being sprayed into the stream of air from the supply path to produce bubbles; a reflector plate arranged to encircle the at least one discharge hole; and a plurality of light sources arranged on the reflector plate.

The bubble blower can further comprise: a passage hole arranged in a center portion of the reflector plate between the case and the at least one discharge hole; and a plurality of holes arranged in the reflector plate to respectively receive the plurality of light sources.

These and other aspects of the present invention can yet also be effected by providing a bubble blower equipped vehicle comprising: a case arranged on a rear portion of the vehicle; at least one discharge hole adapted to discharge bubbles, the discharge hole being arranged in the case; a cartridge filled with a bubble producing liquid; a supply path arranged between the detachable cartridge and the at least one discharge hole and adapted to transfer the bubble producing liquid; a blower fan arranged within an inner portion of the case and adapted to produce a stream of air, the bubble producing liquid being sprayed into the stream of air from the supply path to produce bubbles; a handle arranged on the case and adapted to affix the bubble blower to the vehicle; a reflector plate arranged to encircle the at least one discharge hole; and a plurality of light sources arranged on the reflector plate.

The bubble blower equipped vehicle can further comprise: a passage hole arranged in a center portion of the reflector plate between the case and the at least one discharge hole; and a plurality of holes arranged in the reflector plate to respectively receive the plurality of light sources.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
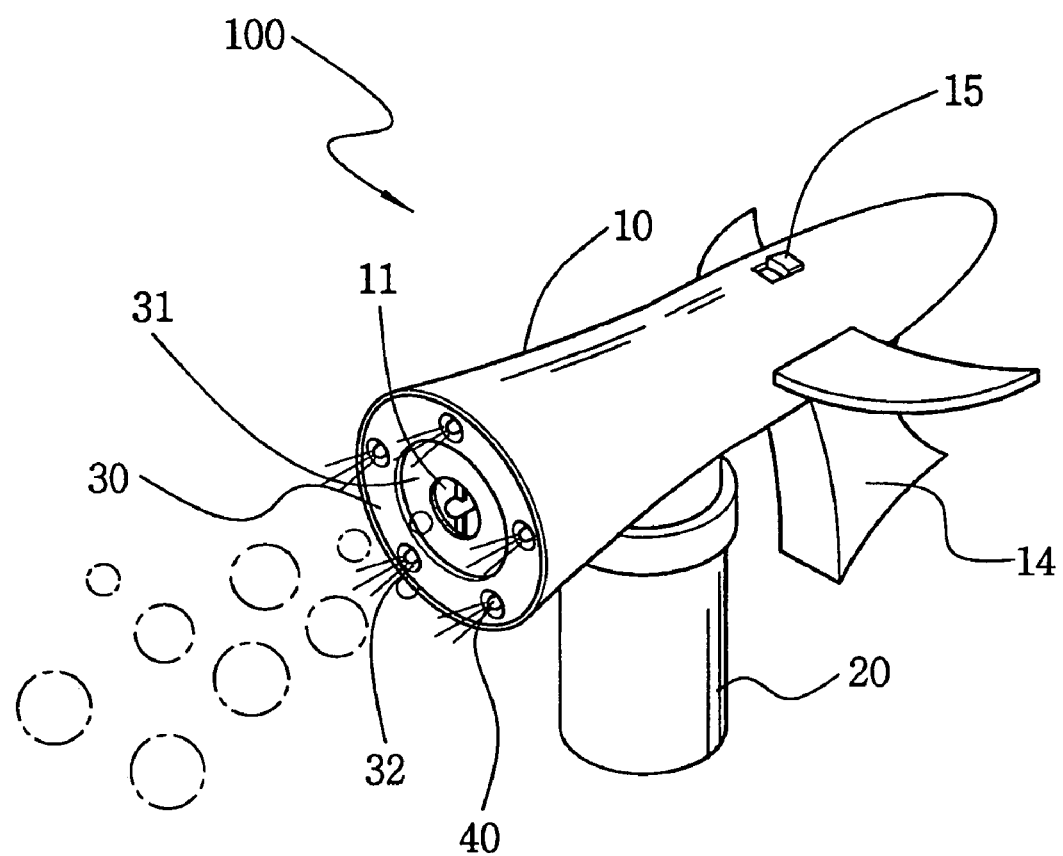
FIG. 1 is a perspective view of a bubble blower according to a first embodiment of the present invention.

Referring now to the drawings, the embodiments according to the present invention are described in detail below.

Figure 2:
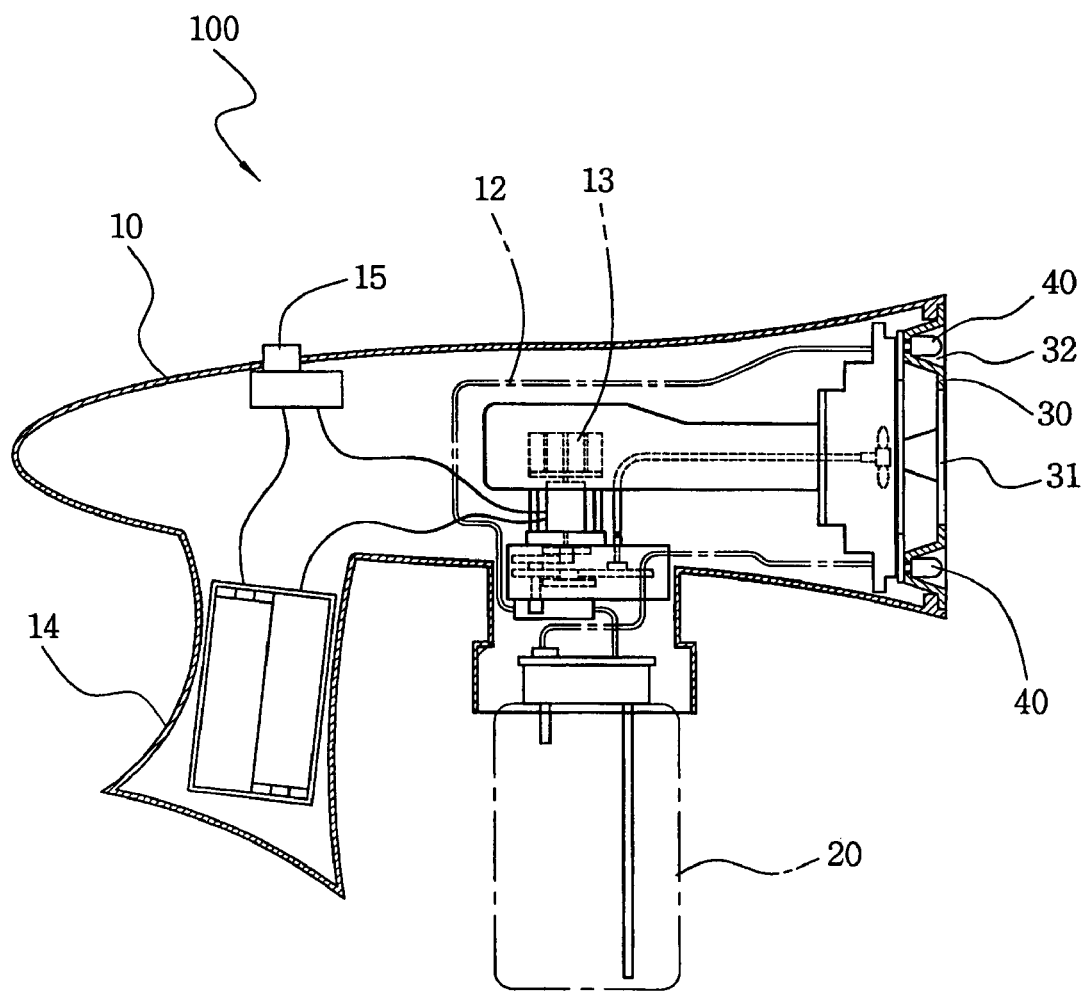
FIG. 2 is a vertical sectional view of the bubble blower according to the first embodiment of the present invention.
Figure 3:
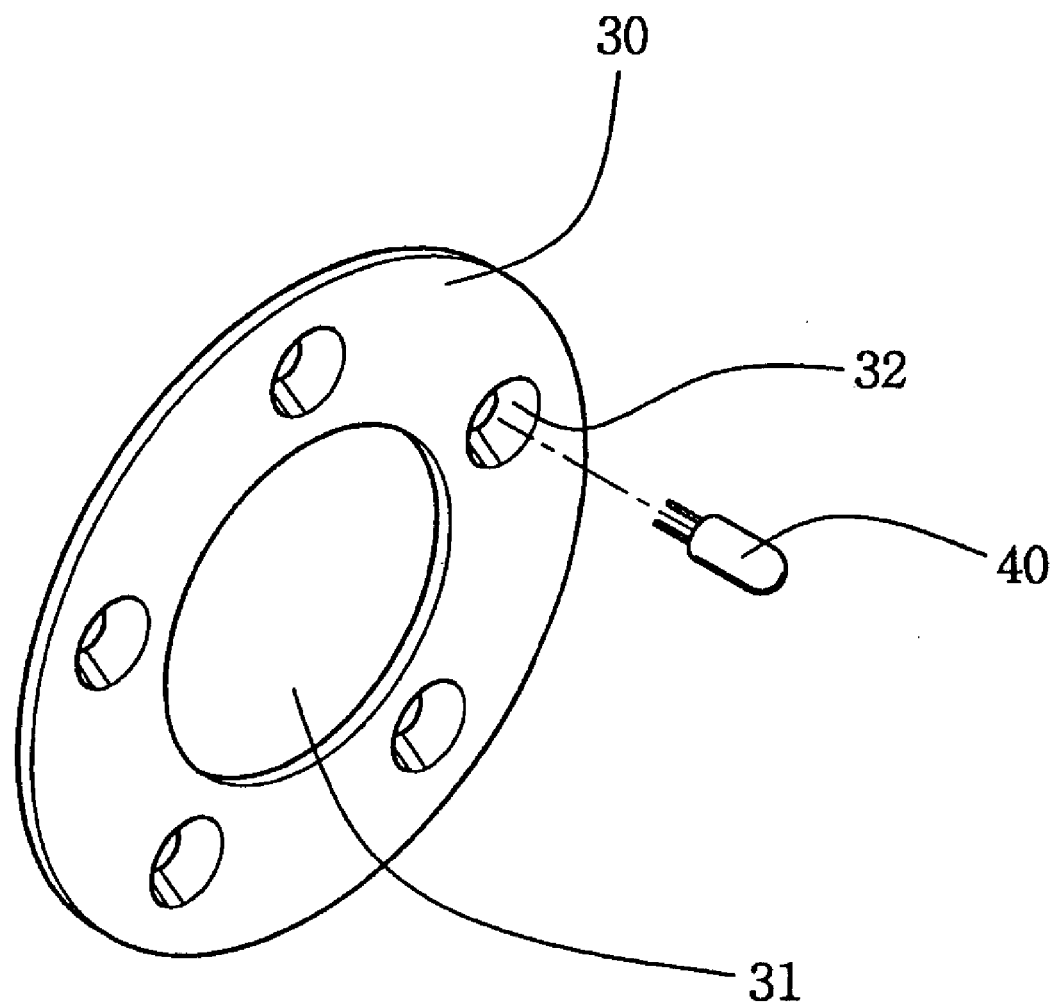
FIG. 3 is a perspective view of a reflector plate of the bubble blower according to the first embodiment of the present invention.
Figure 4:
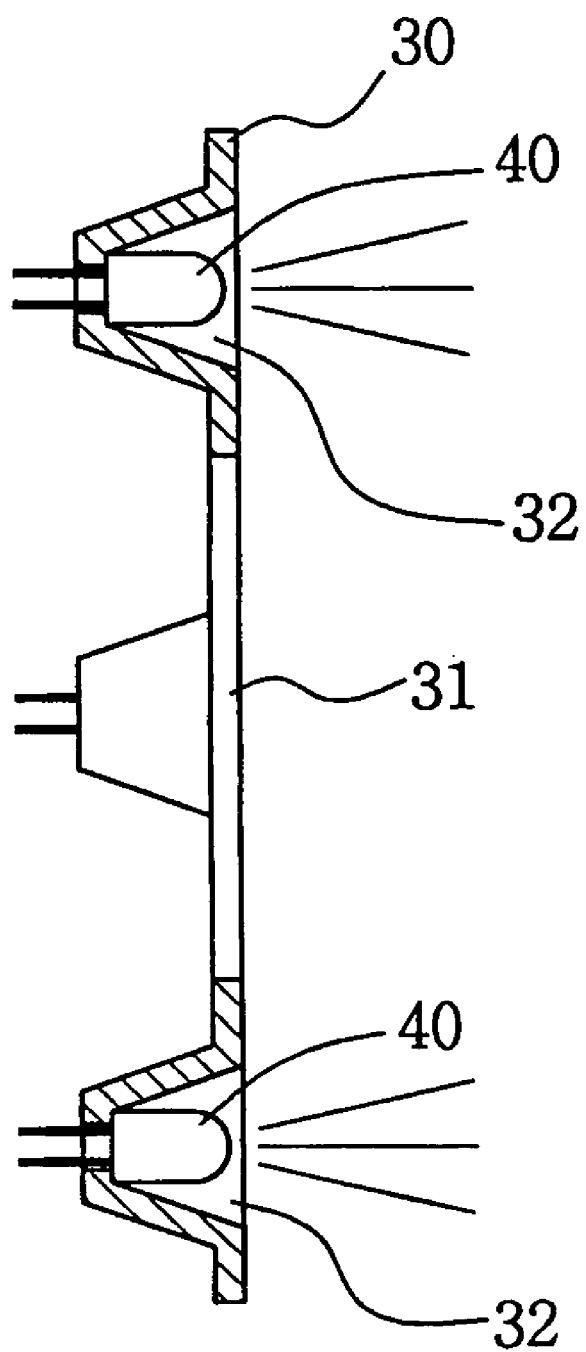
FIG. 4 is a vertical sectional view of the reflector plate of the bubble blower according to the first embodiment of the present invention.

FIG. 1 is a perspective view of a bubble blower according to the first embodiment of the present invention. FIG. 2 is a vertical sectional view of the bubble blower according to the first embodiment of the present invention. FIG. 3 is a perspective view of the reflector plate of the bubble blower according to the first embodiment of the present invention. FIG. 4 is a vertical sectional view of the reflector plate of the bubble blower according to first embodiment of the present invention.

In a bubble blower 100 according to first embodiment of the present invention, a discharge hole 11 where the soap bubbles are discharged is arranged in the front portion of the bubble blower 100. A detachable container 20 filled with liquid soap, glycerin, etc., is attached to the lower portion of a blower case 10. A supply path 12 and a blower fan 13 are arranged in the case 10 and a handle 14 is attached to one side of the lower portion of the case 10. A switch 15 is arranged on the outer portion of the case 10. A reflector plate 30 is arranged around the discharge hole 11 and a plurality of LEDs 40, for example, are arranged around the reflector plate 30. Soap bubbles are generated by the liquid from the container 20 being sprayed into the path of the stream of air generated by the blower fan 13.

As shown in FIGS. 1–4, a passage hole 31 for the soap bubbles is arranged in the center portion of the reflector plate 30 and holes 32 for a plurality of LEDs 40 are arranged around the reflector plate 30. Each LED 40 is arranged in a respective one of the holes 32.

The LEDs in the present invention can use both uncolored LEDs but multicolored LEDs and can advantageously display various colors sequentially. Also, as shown in FIGS. 1–4, the switch 15 is arranged on one side of the upper portion of the case 10 and if the switch 15 is turned on, bubbles are blown continuously and the LEDs output visible light until the switch 15 is turned off. The switch 15 can also be arranged on the handle 14 such that bubbles are blown only while the user is pushing the switch 15.

Figure 5:
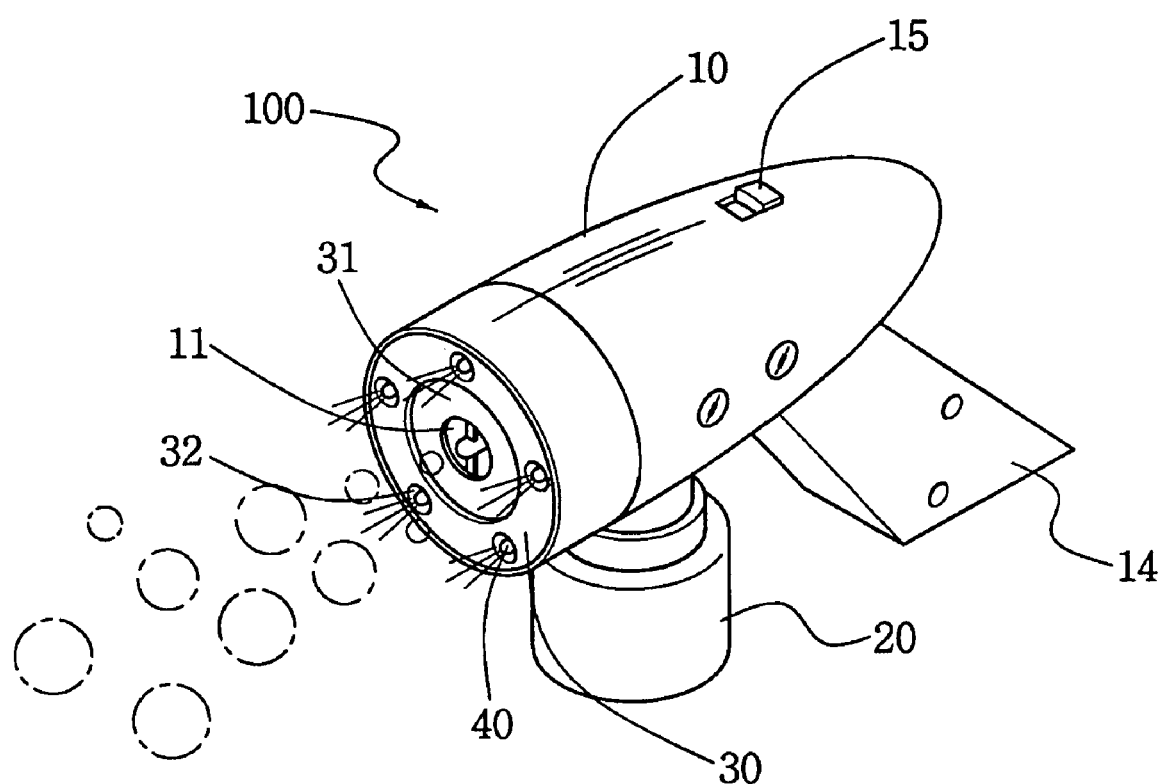
FIG. 5 is a perspective view of a bubble blower according to another embodiment of the present invention.
Figure 6:
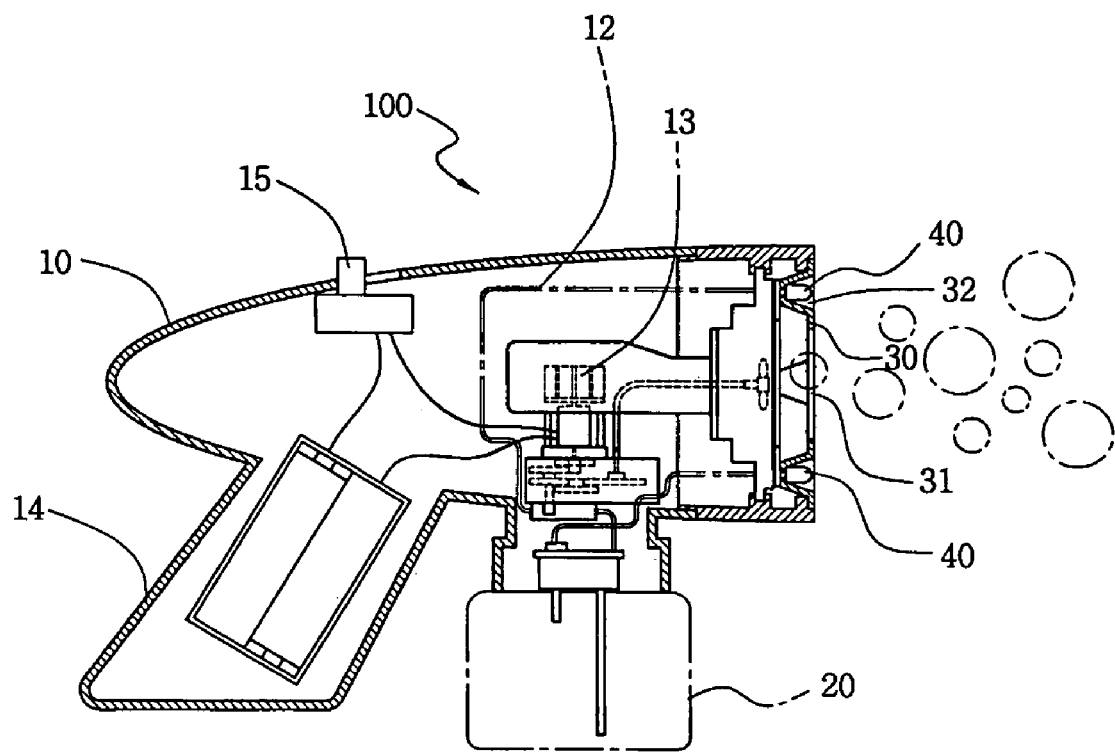
FIG. 6 is a vertical sectional view of the bubble blower according to another embodiment of the present invention.
Figure 7:
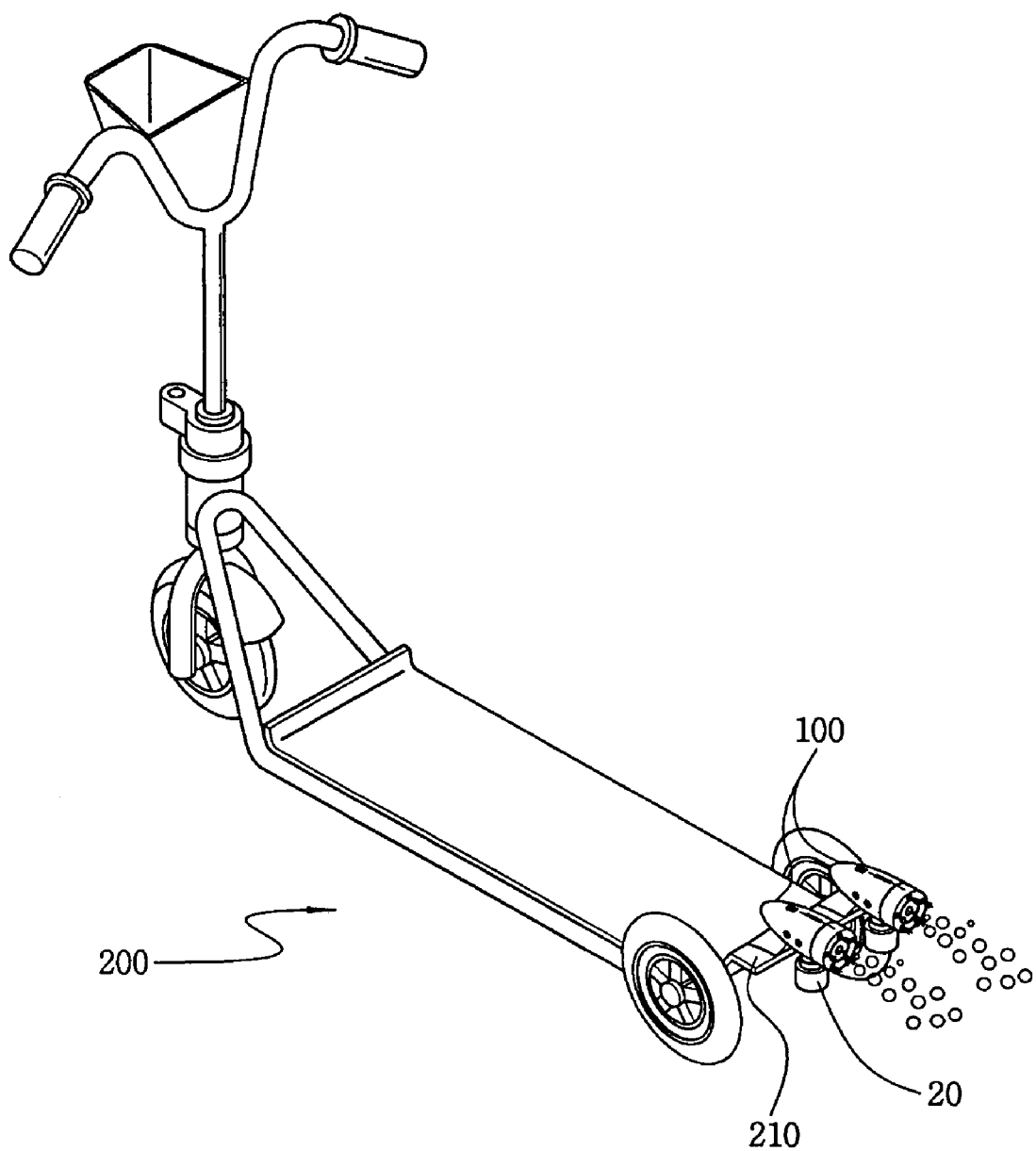
FIG. 7 is a perspective view of a bubble blower equipped scooter according to another embodiment of the present invention.
Figure 8:
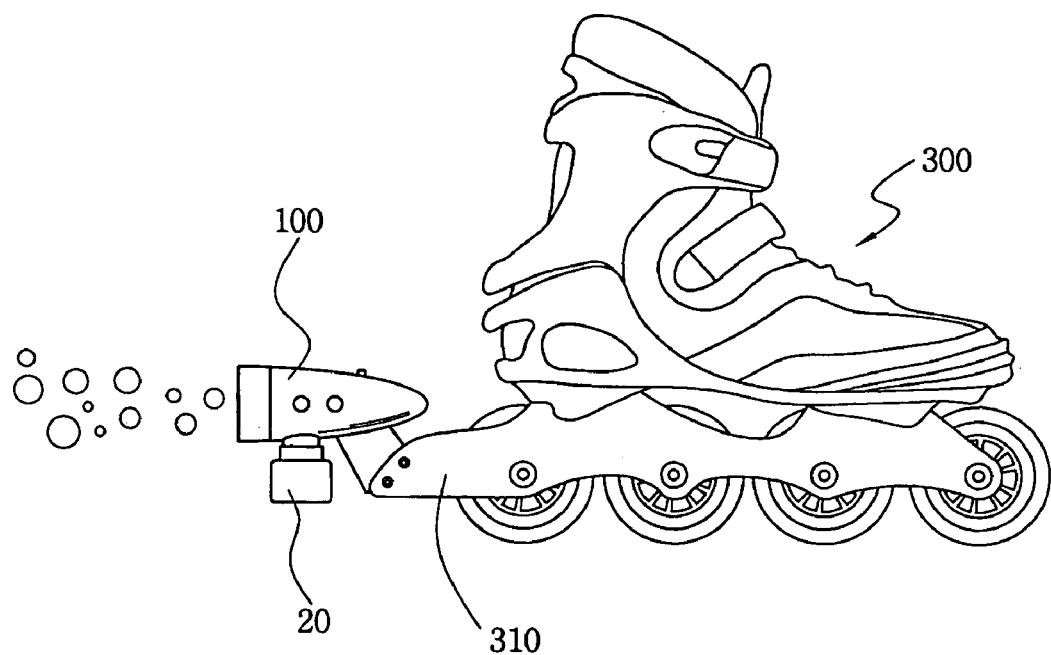
FIG. 8 is a side sectional view of a bubble blower equipped in-line skate according to another embodiment of the present invention.
Figure 9:
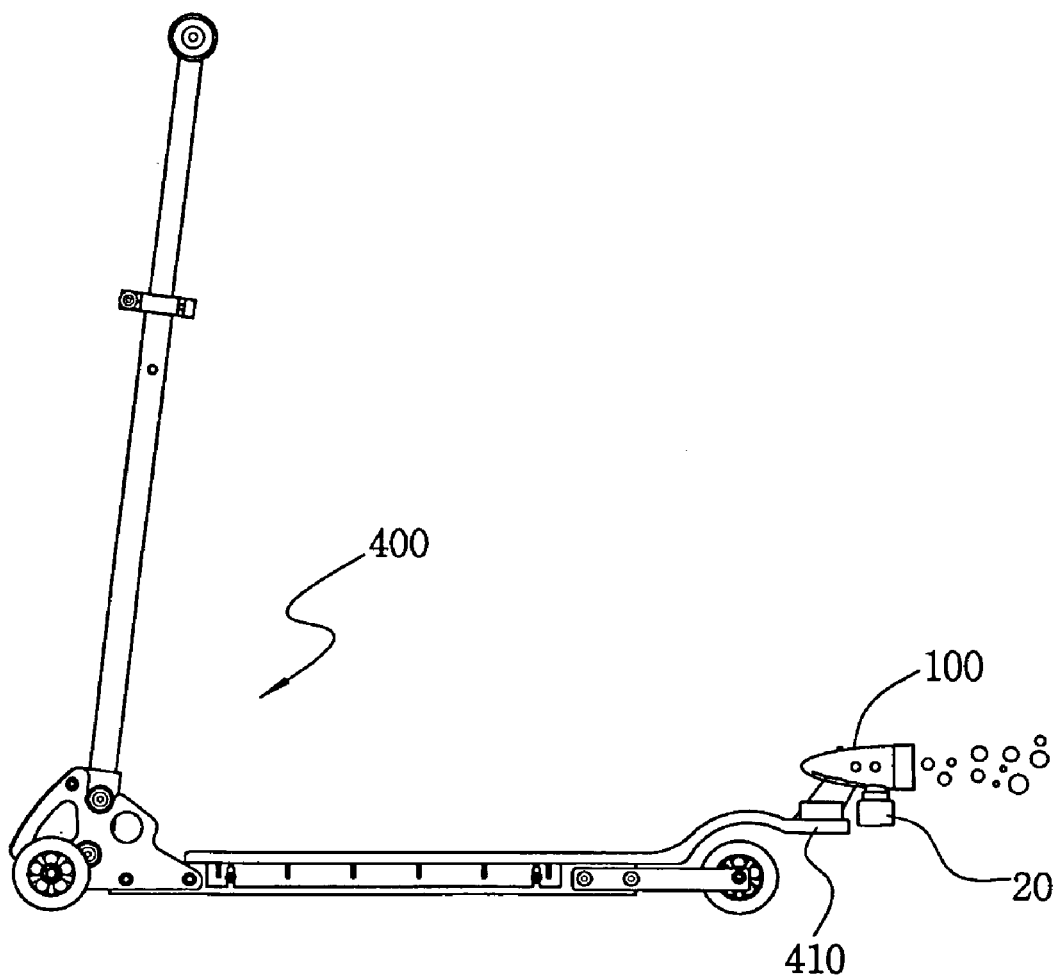
FIG. 9 is a side sectional view of the bubble blower equipped folding scooter according to another embodiment of the present invention.

FIG. 5 is a perspective view of a bubble blower according to another embodiment of the present invention, FIG. 6 is a vertical sectional view of the bubble blower, FIGS. 7–9 are views of vehicles to which the bubble blower is attached.

As shown in FIGS. 7–9, vehicles 200, 300, 400 are equipped with bubble blowers as discussed above.

With respect to the child's scooter 200, as shown in FIG. 7, the bubble blower can be attached to a wheel cover 210 and with respect to the in-line skate 300, as shown in FIG. 8, the bubble blower can be attached to a rear portion of a wheel supporter 310 and also in case of the folding scooter 400, as shown in FIG. 9, the bubble blower can be attached to a rear portion of a footboard 410. However, the attaching point of the bubble blower 100 according to the present invention is not limited to the locations shown in drawings and it is possible to attach it to other locations.

In the bubble blower 100 of the present invention as discussed above, if the blower fan and the LEDs 40 are operated by the user gripping the handle 14 and turning the switch 15 on, soap bubbles are discharged from the discharge hole 11 and are simultaneously illuminated by light from the LEDs 40 that is reflected from the reflector 30, thereby making a more beautiful atmosphere due to the light reflecting off the blown bubbles. When the switch 15 is turned off, the blowing of the soap bubble is stopped and the LEDs 40 are also turned off. Accordingly, the bubble blower and the lights are perfect harmony while the bubble blower is being operated and can make a more beautiful atmosphere because the LEDs 40 according to the present invention are arranged in the holes 32 of the reflector plate 30 and their light is widely spread and reflected toward the blown bubbles.

Furthermore, the vehicles 200, 300, and 400 equipped with the bubble blower according to the present invention can create a more beautiful atmosphere by illuminating the blown soap bubbles at night because if the bubble blower 100 is operated when the vehicles are moving, the soap bubbles are discharged from the discharge hole 11 and simultaneously illuminated by the light from LEDs 40 as reflected by the reflector 30 and the soap bubble are widely spread out quickly.

As described above, the bubble blower 100 according to the present invention and the vehicle that has the bubble blower 100 attached thereto can make a beautiful atmosphere at night and highly improve the merchantability of the bubble blower and the vehicle equipped therewith by illuminating the blown bubbles.

What is claimed is:

1. A bubble blower comprising:

a case;

a discharge hole adapted to discharge bubbles, the discharge hole being arranged in a front portion of the case;

a detachable cartridge filled with a bubble producing liquid and affixed to a lower portion of the case;

a supply path arranged between the detachable cartridge and the discharge hole and adapted to transfer the bubble producing liquid from the detachable cartridge;

a blower fan arranged within an inner portion of the case and adapted to produce a stream of air, the bubble producing liquid being sprayed into the stream of air from the supply path to produce bubbles;

a handle arranged on a lower portion of the case;

a switch arranged on one side of an outer face of the case and adapted to operate the fan by supplying a voltage thereto;

a reflector plate arranged to encircle the discharge hole; and a plurality of Light Emitting Diodes (LEDs) arranged on the reflector plate, the LEDs being operated by the switch supplying a voltage thereto to output visible light.

2. The bubble blower of claim 1, further comprising:

a passage hole arranged in a center portion of the reflector plate between the case and the discharge hole; and a plurality of holes arranged in the reflector plate to respectively receive the plurality of LEDs.

3. A bubble blower equipped vehicle comprising:

a case arranged on a rear portion of the vehicle;

a discharge hole adapted to discharge bubbles, the discharge hole being arranged in a front portion of the case;

a detachable cartridge filled with a bubble producing liquid and affixed to a lower portion of the case;

a supply path arranged between the detachable cartridge and the discharge hole and adapted to transfer the bubble producing liquid from the detachable cartridge;

a blower fan arranged within an inner portion of the case and adapted to produce a stream of air, the bubble producing liquid being sprayed into the stream of air from the supply path to produce bubbles;

a handle arranged on a lower portion of the case and adapted to affix the bubble blower to the vehicle;

a switch arranged on one side of an outer face of the case and adapted to operate the fan by supplying a voltage thereto;

a reflector plate arranged to encircle the discharge hole; and a plurality of Light Emitting Diodes (LEDs) arranged on the reflector plate, the LEDs being operated by the switch supplying a voltage thereto.

4. The bubble blower equipped vehicle of claim 3, further comprising:

a passage hole arranged in a center portion of the reflector plate between the case and the discharge hole; and a plurality of holes arranged in the reflector plate to respectively receive the plurality of LEDs.

5. A bubble blower comprising:

a case;

at least one discharge hole adapted to discharge bubbles, the at least one discharge hole being arranged in the case;

a cartridge filled with a bubble producing liquid;

a supply path arranged between the cartridge and the at least one discharge hole and adapted to transfer the bubble producing liquid from the cartridge;

a blower fan arranged adapted to produce a stream of air in response to a voltage being supplied thereto, the bubble producing liquid being sprayed into the stream of air from the supply path to produce bubbles;

a reflector plate arranged to encircle the at least one discharge hole; and a plurality of light sources arranged on the reflector plate and adapted to output visible light in response to a voltage being supplied thereto.

6. The bubble blower of claim 5, further comprising:

a passage hole arranged in a center portion of the reflector plate between the case and the at least one discharge hole; and a plurality of holes arranged in the reflector plate to respectively receive the plurality of light sources.

7. A bubble blower equipped vehicle comprising:

a case arranged on a rear portion of the vehicle;

at least one discharge hole adapted to discharge bubbles, the discharge hole being arranged in the case;

a cartridge filled with a bubble producing liquid;

a supply path arranged between the detachable cartridge and the at least one discharge hole and adapted to transfer the bubble producing liquid;

a blower fan arranged within an inner portion of the case and adapted to produce a stream of air in response to a voltage being supplied thereto, the bubble producing liquid being sprayed into the stream of air from the supply path to produce bubbles;

a handle arranged on the case and adapted to affix the bubble blower to the vehicle;

a reflector plate arranged to encircle the at least one discharge hole; and a plurality of light sources arranged on the reflector plate and adapted to output visible light in response to a voltage being supplied thereto.

8. The bubble blower equipped vehicle of claim 7, further comprising:

a passage hole arranged in a center portion of the reflector plate between the case and the at least one discharge hole; and a plurality of holes arranged in the reflector plate to respectively receive the plurality of light sources.

* * * * *